Nov. 12, 1957    W. W. EITEL, JR., ET AL    2,812,687
OPTICAL IMAGE PROJECTION SYSTEM FOR FLUOROSCOPIC APPARATUS
Filed Nov. 12, 1953    2 Sheets-Sheet 1

WITNESSES:
E. A. McCloskey.
Leon M. Garman

INVENTORS
William W. Eitel Jr.
and John H. Bantz.
BY
Geo. Crawford
ATTORNEY

Nov. 12, 1957   W. W. EITEL, JR., ET AL   2,812,687
OPTICAL IMAGE PROJECTION SYSTEM FOR FLUOROSCOPIC APPARATUS
Filed Nov. 12, 1953   2 Sheets-Sheet 2
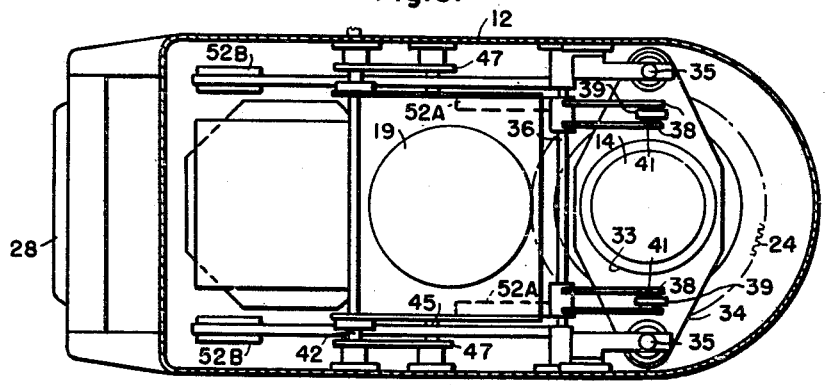
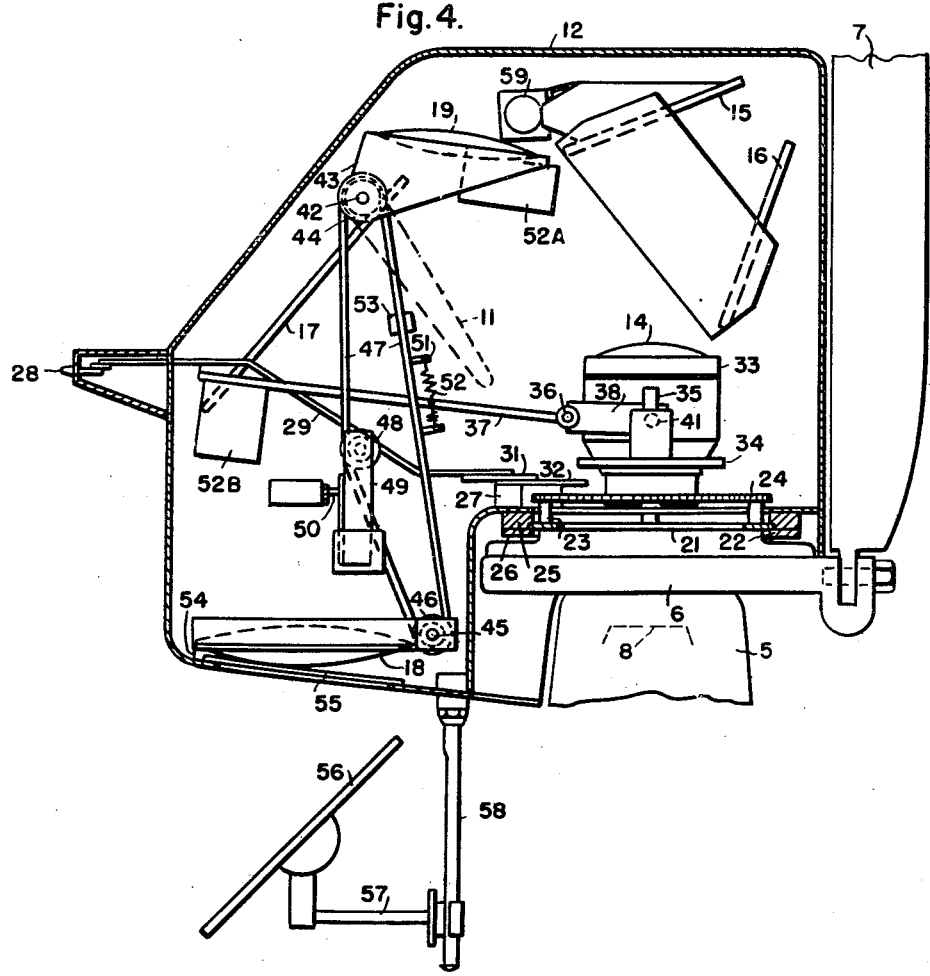

United States Patent Office 2,812,687
Patented Nov. 12, 1957

2,812,687

OPTICAL IMAGE PROJECTION SYSTEM FOR FLUOROSCOPIC APPARATUS

William W. Eitel, Jr., and John H. Bantz, Baltimore, Md., assignors to Westinghouse Electric Corporation, East Pittsburgh, Pa., a corporation of Pennsylvania Application November 12, 1953, Serial No. 391,452

17 Claims. (Cl. 88—24)

Our invention relates to apparatus for carrying out medical fluoroscopic examinations and in particular relates to an optical system and mounting for X-ray image intensifier tubes of the general type described in the Mason and Coltman Patent 2,523,132 issued September 19, 1950 and assigned to the present assignee.

While X-ray fluoroscopic examinations have been practiced for many years in the medical art, the image in abdominal and similar examinations has been so faint that the physician has had to dark-adapt his eyes for periods of the order of half an hour to be able to make out details. The above-mentioned Mason and Coltman patent overcomes this defect by mounting the fluorescent screen onto which the X-ray image is projected within a tube which presents on its output screen a greatly intensified replica of the fluorescent image. However, the output screen image, while enhanced in brightness by several hundred fold, is of diminished size, is of reversed and inverted aspect, and is located in a position which would make it very awkward for the physician to view. We have found it possible to devise an optical system and mount which not only enables the physician to view the image without inconvenience, but erects the image so that it is presented to the physician in the normal position in which he sees the patient, and at the same time presents to his eyes an enlarged image having the full brightness of the contracted view on the screen.

One object of our invention is accordingly to provide a new and improved apparatus for medical fluoroscopic examinations.

Another object is to provide an optical system and mount for image tubes of a type in which the tube output screen image is inverted and reversed.

Another object is to provide an optical system and mount which presents an enlarged image having the full brightness of an image screen.

Another object is to provide an optical system and mount for an image screen which shall both enlarge the image without substantially decreasing its brightness while also erecting and reversing the aspect on output screen.

Another object is to provide an X-ray image viewing screen with an optical system and mounting which removes the observer from the path of the X-rays.

Another object is to provide an X-ray image apparatus with an optical system and mount which enables the examining physician to view an image of true aspect from a position where he can conveniently palpate the patient.

Still another object is to provide an image viewing apparatus with an optical system which enables the observer to view the object at lower magnification from a wide variety of head positions and/or with binocular vision and then to shift this system by a simple unitary and convenient manipulation to one in which he sees the object at higher magnification.

Yet another object is to provide an image intensifier tube with an optical system and mount which may be adjusted to accommodate either tall or short operators, and to permit the observer to view the image plainly while taking any desired position along a horizontal plane relative to an X-ray tube which is traversed lengthwise of the table.

Yet another object is to provide an X-ray examination table of the type which may be tilted through wide angles relative to the horizontal with an optical system and mount which enables the physician to conveniently view the output image while standing at substantially any desired position.

Still another object is to provide a medical image converter tube with an optical system and mount which may be rotated about the optical axis of the converter tube without disturbing the focussing of the picture.

Other objects of our invention will become apparent upon reading the following description taken in connection with the drawings, in which:

Fig. 4 is an elevation partly in section of the assembled optical system and housing of Fig. 1; and Fig. 5 is a view partly in section taken at right angles to Fig. 4.

Figure 1:
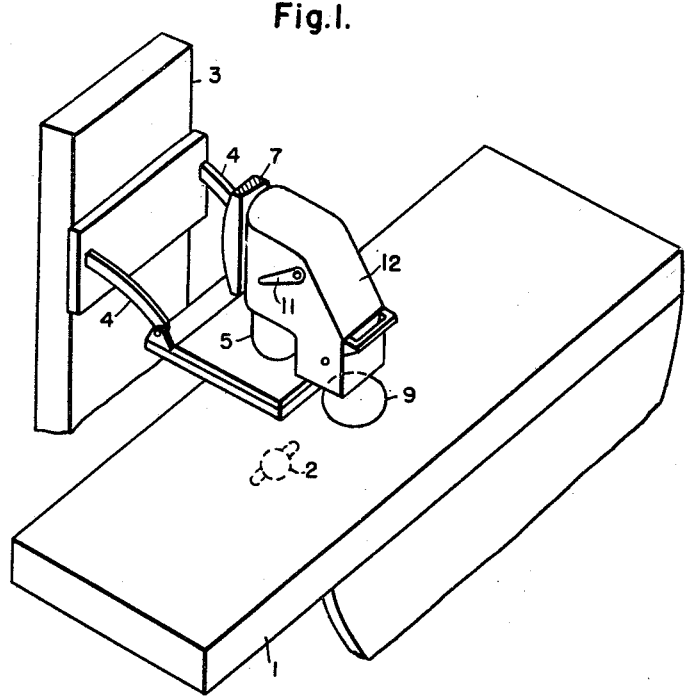
Figure 1 is a general view in perspective showing the positioning of an optical system embodying the principles of our invention relative to a typical X-ray examination table and fluorescent image intensifier tube.

Referring in detail to Fig. 1, an X-ray examination apparatus of modern type has a table 1, on which the patient lies, which is arranged to tilt up to ninety degrees in either direction from the horizontal by mechanism (not shown) in its base. An X-ray tube 2 is supported beneath the table from a tower 3 by a mechanism which can move it to any position transverse to the table, and the tower 3 is supported on rails (not shown) on which it may be moved to any longitudinal position along the table, so that any desired portion of the patient's body may be X-rayed. The tower 3 and its supporting rails tilt with the table so that the tower is always perpendicular to the table and the X-ray tube projects its beam upward in a direction perpendicular to the table. Structure and mechanism for such an X-ray examination apparatus are well known in the art, so they will not be described in further detail here.

In accordance with prior art practice, a fluorescent screen has been suspended on bracket-arms 4 above and parallel to the table top and the X-rays produced a light image of the X-ray stream which had passed from tube 2 upward through the patient's body. However, as stated above, the light image or the fluorescent screen was exceedingly dim when the X-ray stream traversed the full thickness of the patient's body, and X-ray image intensifier tubes, which are described in considerable detail in the above-mentioned Mason and Coltman patent, are now being placed on the market, these tubes presenting a picture which is several hundred times as bright as that on the conventional fluorescent screen. Such an image intensifier tube 5 appears in outline in Fig. 1, being supported on a yoke mounting ring 6 (see Fig. 4) attached to an arm 7 which is supported from the ceiling. The output screen of tube 5 on which appears a very bright but small light image of the body portion being X-rayed is indicated at 8 in Figs. 2, 3 and 4, and this forms the object which our optical system magnifies, erects, reverses and makes visible in a mirror 9 to the examining physician who stands beside the table.

When the table 1 is horizontal, as in Fig. 1, the physician may wish to take any one of a number of different positions along it to be able to palpate some portion of the patient's body, or for some such reason. To permit this, our optical system is arranged to be rotated for ninety degrees or more either way from that shown in Fig. 1 about the optical axis of tube 5 (which is perpendicular to the table top). To accommodate observers of different height, the mirror 9 is arranged so that it may be tilted relative to the horizontal. When, on the other hand, the table is tilted to ninety degrees relative to the horizontal, rotation of the optical system about the (then horizontal) tube axis plus the rotation of mirror 9 accommodates observers of different height, while tilting of mirror 9 takes care of different stations of the observer on the floor. For table-tilts between the two just described, the observer may be accommodated by properly combining rotation of the optical system and tilting of mirror 9.

A housing 12 seals the optical system from entrance of dust and maintains the mirrors and lenses in a highly efficient condition optically.

As previously stated, our optical system has been arranged to provide two different magnifications of the image; a low (two-fold) magnification to assist in locating the organ of the patient's body which it is desired to examine, and a large (seven-fold) magnification for the ultimate examination. These two magnifications are attained by providing two different field lenses which are used in alternation. The shift from one to the other is made by moving a handle 11 on the side of the housing which shifts from one field lens to the other and at the same time so moves the objective lens as to bring the output image to focus at approximately the same position as before the shift.

Figure 2:
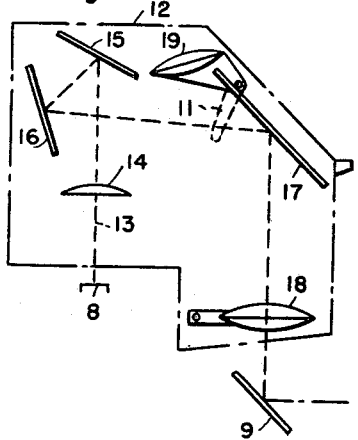
Fig. 2 is a diagrammatic showing of the optical system of Fig. 1 with the lenses positioned for greatest magnification of the image.
Figure 3:
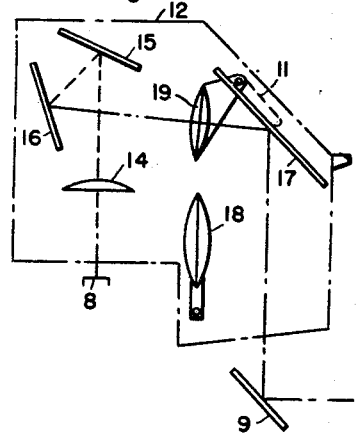
Fig. 3 is a similar showing with the lenses positioned for lowest magnification of the image.

Figs. 2 and 3 diagram the positions of the mirrors and lenses in the high magnification and low magnification states just referred to. Thus, light beams such as are indicated by the dash-dot line 13 emanate from the output screen 8 of the image intensifier tube 5, pass through the objective lens 14, are reflected successively from mirrors 15, 16 and 17, pass through field lens 18 to mirror 9 in which the physician sees a focussed picture of the light-image of screen 8. The field lens 19 is turned out of the optical path between mirrors 16 and 17. On turning the handle 11 to the position indicated in Fig. 3, the field lens 18 is moved out of the optical path and the field lens 19, which is of lower magnifying power is moved across the optical path. At the same time, the objective lens 14 is moved upward to maintain the output image in focus for the observer.

Turning to Fig. 4, which shows the structure of our optical system in greater detail, the image intensifier tube having its output screen at 8 is supported from tower 3 on a yoke-mounting ring 6 above the patient on table 1 and in the path of the X-rays from X-ray tube 2. Attached to ring 6 is a bearing plate 21 having an overhanging circular edge 22 and supporting on several posts 23 a gear-ring 24 having gear-teeth around its periphery.

Clamped opposite faces adjacent the edge of the bearing-plate 21 are a pair of cooperating rings 25 and 26 the engaging faces between which and bearing-plate 21 are lined with a smooth plastic which permits the ring 25 to slide smoothly around bearing-plate 21, so that ring 25 may rotate about the central axis of screen 8 and yoke mounting 6.

The upper face of ring 25 is affixed to the floor of the housing 12 so that the latter and its entire contents except gear-ring 24 may be rotated about the central axis of screen 8 which is also the optical axis of the image intensifier tube 5. To enable the user to fix the optical system in the azimuth about the axis of screen 8 which he desires, a plunger assembly 27, supported from the walls of housing 12, is arranged with a spring-biased plunger which engages the toothed edge of gear-ring 24 except when the physician retracts the plunger by moving a release bar 28, positioned on the front of the housing and retracting the plunger through a linkage 29, 31, 32. To rotate the housing 12 about the optical axis of the image intensifier tube 5, the physician moves release bar 28 to disengage the plunger of assembly 27 from the toothed edge of gear-ring 24, moves the housing to the desired position, and then releases bar 28 to permit the plunger to be pressed by its spring into engagement with gear-ring 24. Bumpers prevent rotation of housing 12 through too wide an angle.

The objective lens 14, which may be of the multi-lens type to minimize aberration in accordance with known optical practice, is supported in a cylindrical holder 33, which is affixed to a mounting-plate 34, which, in turn, slides on two bearing-shafts 35 which project from the wall of housing 12 parallel to the optical axis of image screen 8. This arrangement permits objective lens 14 to be moved with its central axis always coinciding with said optical axis, where handle 11 is moved to shift the optical system from its low to its high magnification state as described in connection with Figs. 2 and 3.

Motion of the objective lens 14 along the bearing-shafts 35 is effected by a pair of lens-adjuster assemblies comprising a jack shaft 36, which is journaled at opposite ends on housing 12 and which is rotated through a small angle by a rod 37, a pair of rocker-arms 38 fastened to jack shaft 36, and a pair of roller-arms 39 which project from objective lens mounting-plate 34. Rollers 41 on roller arms 39 provide a practically friction-free engagement with rocker arms 38 so that when rod 37 rotates jack-shaft 36 through a small angle, the objective-lens 14 is displaced along the bearing-shafts 35.

To cause movement of handle 11 to rotate lens 18 out of the optical axis, and lens 19 into the optical axis of the optical system while also displacing the objective lens 14 along the optical axis, as previously described in connection with Figs. 2 and 3, its support shaft 42 journaled in housing 12, and to which a lens holder 43 for field-lens 19 is affixed, is provided with a sprocket 44. A similar shaft 45, to which field lens 18 is affixed, is journaled in housing 12 and provided with a sprocket 46 and the sprockets 44 and 46 are interlinked by a chain 47. An idler-sprocket 48 supported on a support arm 49, pivotally supported to the housing 12 and provided with a bias 50 takes up any slack in chain 47. Thus, movement of handle 11 turns field lenses 18 and 19 together by moving chain 47. Simultaneously, rod 37 is moved to turn shaft 36 and displaces objective lens as above-described by a carriage 51 which is bolted to a link in chain 47 and which is linked to rod 37 by a spring-connection 52. This spring connection permits the jack-shaft 36 to turn and displace objective lens 14 when handle 11 is moved until the lens 14 reaches an adjustable stop which limits its travel at the proper point for optical purposes, the spring-connection then holding lens 14 firmly against the stop while handle 11 is moved to field-lenses 18 and 19 to their operative positions. Counterweights 52A and 52B are provided on the lens-holder 19 and rod 37 to balance their torques on handle 11.

A pair of magnets 53 and 54 are positioned to be engaged by brackets on the frames holding field-lenses 18 and 19 to lock those lenses firmly in place when moved to their active positions. A glass window 55 embraces the optical path through the housing wall and insures a dust-free environment within housing 12.

In line with the image path from reflector 17 outside the housing 12 is a mirror 56 supported pivotally on an arm 57 which in turn is movable up and down and rotatable about a pillar 58 attached to housing 12. Mirror 56 can thus be tilted and turned through substantial angles to enable the observer to see the image from a wide range of positions.

The mirrors 15, 16 and 17 are front-face reflecting and are coated for maximum reflectivity for light of wavelength 5,700 Angstroms. The back-face reflecting mirror 56 has its front-face coated with an anti-reflection layer. The lenses 14, 18 and 19 are likewise treated with anti-reflecting layers, as are also both faces of window 55.

The mounting plate for mirror 15 is provided with a hole through which light from image screen 8 passes to a photo timer pickup 59 which may be arranged to time the duration of X-ray exposure.

We claim as our invention:

1. An optical system comprising a support structure, an object lens, first and second mirrors supported at an angle of other than ninety degrees to the optical axis of said lens and positioned to form a light path including said optical axis, a third mirror positioned to receive light projected from said second mirror and a first and second field lens pivotally supported on said structure for alternative movement into operative position in said light path and means interlinking said field lenses and said object lens for moving said object lens in a direction parallel to its optical axis when said field lenses turn on their pivots.

2. An optical system comprising a support structure, an object lens, means to form a light path including the optical axis of said lens and having a final portion displaced from but substantially parallel to said optical axis, a light deflector supported on said structure in said displaced light path and means for supporting said structure for rotation about said optical axis.

3. An optical system comprising a support structure, an object lens, first and second mirrors supported at an angle of other than ninety degrees to the optical axis of said lens and positioned to form a light path including said optical axis, a third mirror positioned to receive light projected from said second mirror and project it on a path displaced from but parallel to said optical axis, a first and a second field lens pivotally supported on said structure for alternative movement into operative position in said light path and means interlinking said field lenses and said object lens for moving said object lens in a direction parallel to its optical axis when said field lenses turn on their pivots, means for supporting said structure for rotation about said optical axis, and a fourth mirror pivotally supported in said displaced path.

4. An optical system comprising a support structure, an object lens, first and second mirrors supported at an angle of other than ninety degrees to the optical axis of said lens and positioned to form a light path including said optical axis, a third mirror positioned to receive light projected from said second mirror and project it on a path displaced from but parallel to said optical axis, a first and a second field lens pivotally supported on said structure for alternative movement into operative position in said light path, means interlinking said field lenses and said object lens for moving said object lens in a direction parallel to its optical axis when said field lenses turn on their pivots, means for supporting said structure for rotation about said optical axis and for rotation about an axis normal to said optical axis, and a fourth mirror pivotally supported in said displaced path.

5. An optical system comprising a support structure, an object lens, first and second mirrors supported at an angle of other than ninety degrees to the optical axis of said lens and positioned to form a light path including said optical axis, a third mirror positioned to receive light projected from said second mirror and project it on a path displaced from but parallel to said optical axis, a first and a second field lens pivotally supported on said structure for alternative movement into operative position in said light path, means interlinking said field lenses and said object lens for moving said object lens in a direction parallel to its optical axis when said field lenses turn on their pivots, means for supporting said structure for rotation about said optical axis and for rotation about an axis normal to said optical axis, and a fourth mirror pivotally supported in said displaced path, said means for supporting comprising an arcuate member and a connection actuable for releasably engaging said arcuate member to prevent rotation of said arcuate member.

6. In combination with an X-ray fluoroscopic apparatus, an image viewing system comprising a support structure, an object lens, means to form a light path including the optical axis of said lens and having a final portion displaced from but substantially parallel to said optical axis, a light deflector pivotally supported on said structure in operative position in said final portion, and means supporting said structure for rotation about said optical axis.

7. In combination with an X-ray fluoroscopic apparatus, an image viewing system comprising a support structure, an object lens, means to form a light path including the optical axis of said lens and having a final portion displaced from but substantially parallel to said optical axis, a light deflector pivotally supported on said structure in operative position in said final portion, and means supporting said structure for rotation about said optical axis and about another axis.

8. In combination with an X-ray fluoroscopic apparatus, an image viewing system comprising a support structure, an object lens, mirrors positioned to form a light path including the optical axis of said lens and having a final portion displaced from but substantially parallel to said optical axis, a light deflector mirror supported on said structure in said displaced light path and means for supporting said structure for rotation about said optical axis.

9. In combination with an X-ray fluoroscopic apparatus, an image viewing system comprising a support structure, an object lens, first and second mirrors supported at an angle of other than ninety degrees to the optical axis of said lens and positioned to form a light path including said optical axis, a third mirror positioned to receive light projected from said second mirror and project it on a path displaced from but parallel to said optical axis, a first and a second field lens pivotally supported on said structure for alternative movement into operative position in said light path, means interlinking said field lenses and said object lens for moving said object lens in a direction parallel to its optical axis when said field lenses turn on their pivots, means for supporting said structure for rotation about said optical axis and for rotation about an axis normal to said optical axis, and a fourth mirror pivotally supported in said displaced path, said means for supporting comprising an arcuate member and a connection actuable for releasably engaging said arcuate member to prevent rotation of said arcuate member.

10. In combination with a tiltable support, an optical system for viewing the picture on an image intensifier carried on said support, said optical system comprising a support structure, an object lens, means to form a light path including the optical axis of said lens and having a final portion displaced from but substantially parallel to said optical axis, a light deflector supported on said structure in said displaced light path and means for supporting said structure for rotation about said optical axis.

11. In combination with an X-ray tilt table, an optical system for viewing the picture on an image intensifier connected to said table for tilting movement therewith, said optical system comprising a support structure, an object lens, means to form a light path including the optical axis of said lens and having a final portion displaced from but substantially parallel to said optical axis, a light deflector member pivotally supported on said structure in said displaced light path, means for supporting said structure for rotation about said optical axis and about an axis parallel to the tilt-axis of said X-ray table.

12. An optical system for magnifying and orienting an image taken from an image intensifier comprising a support structure, an object lens, means to form a light path having a first, a second and a final portion, with said first portion including the optical axis of said lens, said final portion being displaced from and substantially parallel to said optical axis, and with said second portion extending laterally between said first portion and said final portion, a light deflector member pivotally mounted on said support structure in said final portion, and means for supporting said structure for rotation about said optical axis.

13. An optical system for use with an image intensifier tube having a fluorescent input screen and an output screen for producing a visible image comprising a support structure, an object lens mounted on said support structure so as to be positionable adjacent said output screen with its optical axis intersecting the optical axis of said image intensifier tube at said output screen, means to form a light path having at least a first portion and a second portion, with said first portion including the optical axis of said object lens and said second portion extending laterally from said axis, a light deflector supported on said structure in said light path at one side of said image intensifier tube, and in a transverse plane lying between said input screen and said object lens, and means for supporting said support structure for rotation about said optical axis.

14. An optical system for use with an image intensifier tube having a fluorescent input screen and an output screen for producing a visible image comprising a support structure, an object lens mounted on said support structure so as to be positionable adjacent said output screen with its optical axis intersecting the optical axis of said image intensifier tube at said output screen, means to form a light path having at least a first portion and a second portion, with said first portion including the optical axis of said object lens and said second portion extending laterally from said axis, a light deflector supported on said structure in said light path at one side of said image intensifier tube, and in a transverse plane lying between said input screen and said object lens, and means for supporting said structure for pivotal movement in relation to said image intensifier tube about the optical axis of said object lens.

15. In combination with means for producing a beam of penetrating radiation and the like, an image intensifier tube aligned with said beam to produce a visible light-image on an output screen, an object lens positioned adjacent said output screen and having its optical axis aligned with said beam and said image intensifier tube, a first mirror supported at an angle of other than 90° to the optical axis of said lens and positioned to be intersected by said axis and to form a light path including said optical axis, a viewing mirror positioned at one side of said image intensifier tube and lying in plane transverse to said axis and between said means producing a beam of penetrating radiation and said object lens, a field lens positioned in said light path, and a support structure for supporting said mirrors and said field lens for rotation relative to said image intensifier tube to project an image of said output screen to one of a plurality of peripherally spaced positions.

16. In combination with an X-ray image intensifier tube having an input screen and an output screen for producing a visible light-image of an object irradiated by penetrating radiation, a support structure, an object lens positioned within said structure adjacent said output screen with its optical axis intersecting said screen, a light deflector supported on said structure and spaced from said axis at one side of said image intensifier tube in a plane transverse to said image intensifier tube between said input screen and said lens, means to form a light path extending from said object lens to said light deflector with an initial portion of said light path including the optical axis of said lens and with another portion of said light path extending laterally from said axis at an angle of other than 90°, and means for supporting said structure for pivotal movement relative to said image intensifier tube about the optical axis of said object lens.

17. In combination with an X-ray image intensifier tube having an input screen and an output screen for producing a visible light image of an object irradiated by penetrating radiation, a support structure, an object lens positioned within said structure adjacent said output screen with its optical axis positioned to coincide with the optical axis of said image intensifier tube, a light deflector supported on said structure and spaced from said axis at one side of said image intensifier tube in a position intercepted by a plane transverse to said image intensifier tube between said input screen and said lens, means to form a light path extending from said object lens to said light deflector with an initial portion of said light path being aligned with said axes and with another portion of said light path extending laterally from said axis at an angle of other than 90°, and means for supporting said structure for pivotal movement relative to said image intensifier tube about the optical axis of said tube.

References Cited in the file of this patent

UNITED STATES PATENTS

| Number | Name | Date |
|---|---|---|
| Re. 17,530 | Mitchell | Mar. 10, 1931 |
| 913,530 | Mellre | Feb. 23, 1909 |
| 947,058 | Duncan | Jan. 18, 1910 |
| 2,310,273 | Bancroft | Feb. 9, 1943 |
| 2,330,799 | Coker et al. | Oct. 5, 1943 |
| 2,506,764 | Bach | May 9, 1950 |
| 2,536,866 | Barcus | Jan. 2, 1951 |
| 2,632,357 | Mihalyi | Mar. 24, 1953 |
| 2,641,955 | Bretthauer | June 16, 1953 |